United States Patent
Kim et al.

(10) Patent No.: US 9,520,579 B2
(45) Date of Patent: Dec. 13, 2016

(54) RECHARGEABLE BATTERY

(75) Inventors: Yong-Sam Kim, Yongin-si (KR);
Jang-Hyun Song, Yongin-si (KR);
Tai-Sun You, Yongin-si (KR)

(73) Assignees: SAMSUNG SDI CO., LTD.,
Yongin-Si, Gyeonggi-Do (KR);
ROBERT BOSCH GmbH, Stuttgart (DE)

( * ) Notice: Subject to any disclaimer, the term of this patent is extended or adjusted under 35 U.S.C. 154(b) by 1201 days.

(21) Appl. No.: 13/530,353

(22) Filed: Jun. 22, 2012

(65) Prior Publication Data

US 2013/0122356 A1 May 16, 2013

(30) Foreign Application Priority Data

Nov. 15, 2011 (KR) ........................ 10-2011-0119009

(51) Int. Cl.
*H01M 2/30* (2006.01)
*H01M 2/02* (2006.01)

(52) U.S. Cl.
CPC .............. *H01M 2/027* (2013.01); *H01M 2/30* (2013.01)

(58) Field of Classification Search
None
See application file for complete search history.

(56) References Cited

U.S. PATENT DOCUMENTS

| | | | | |
|---|---|---|---|---|
| 2003/0091897 A1* | 5/2003 | Oogaku | ................... | H01M 2/06 429/181 |
| 2007/0202364 A1* | 8/2007 | Uh | ..................... | H01M 2/0404 429/7 |
| 2008/0107962 A1* | 5/2008 | Uh | ..................... | H01M 2/0404 429/164 |
| 2010/0233528 A1* | 9/2010 | Kim | ..................... | H01M 2/043 429/178 |
| 2011/0097613 A1 | 4/2011 | Kim et al. | | |
| 2011/0104562 A1 | 5/2011 | Byun et al. | | |
| 2012/0156548 A1* | 6/2012 | Kim | ..................... | H01M 2/0237 429/158 |

FOREIGN PATENT DOCUMENTS

| | | |
|---|---|---|
| JP | 2001-357834 A | 12/2001 |
| JP | 2010-146735 A | 7/2010 |
| KR | 10-2008-0009462 A | 1/2008 |
| KR | 10-2001-0047611 A | 5/2011 |
| KR | 10-2011-0045304 A | 5/2011 |

OTHER PUBLICATIONS

Korean Office Action dated Aug. 10, 2016 of the corresponding Korean Patent Application No. 10-2011-0119009; Yong-Sam Kim, et al.

* cited by examiner

*Primary Examiner* — Patrick Ryan
*Assistant Examiner* — Haixia Zhang
(74) *Attorney, Agent, or Firm* — Lee & Morse, P.C.

(57) ABSTRACT

A rechargeable battery including an electrode assembly performing charging and discharging; a case accommodating the electrode assembly; a cap plate coupled with the case; an electrode terminal in a terminal hole of the cap plate, the electrode terminal being electrically connected to the electrode assembly; and an insulator electrically insulating the electrode terminal and the cap plate, wherein the insulator includes a first member between an outside of the cap plate and a surface of the electrode terminal facing the cap plate, and a second member enclosing an outer surface of the electrode terminal and the first member and being coupled with the first member with a step structure.

13 Claims, 7 Drawing Sheets

RECHARGEABLE BATTERY

BACKGROUND

1. Field

Embodiments relate to a rechargeable battery.

2. Description of the Related Art

A rechargeable battery is a battery that may be repeatedly charged and discharged, unlike a primary battery. Low-capacity rechargeable batteries may be used for portable compact electronic apparatuses, e.g., mobile phones or notebook computers and camcorders, and high-capacity rechargeable batteries may be used as a power source for, e.g., driving a motor of a hybrid vehicle, etc.

For example, the rechargeable battery may include an electrode assembly (including electrodes at sides of a separator), a case (receiving or accommodating the electrode assembly), a cap plate (coupled with, e.g., an opening of, the case), and electrode terminals in the cap plate, the electrode terminals being connected to the electrodes through lead tabs.

The electrode terminal may include, e.g., a rivet terminal coupled to a terminal hole of the cap plate, a plate terminal connected to the rivet terminal, and a bolt terminal connected to the plate terminal. The plate terminal may be installed in a terminal hole of the cap plate while interposing an insulator therebetween.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly performing charging and discharging; a case accommodating the electrode assembly; a cap plate coupled with the case; an electrode terminal in a terminal hole of the cap plate, the electrode terminal being electrically connected to the electrode assembly; and an insulator electrically insulating the electrode terminal and the cap plate, wherein the insulator includes a first member between an outside of the cap plate and a surface of the electrode terminal facing the cap plate, and a second member enclosing an outer surface of the electrode terminal and the first member and being coupled with the first member with a step structure.

The first member may include a plate portion between the outside of the cap plate and the surface of the electrode terminal facing the cap plate, and a frame portion on the plate portion, the frame portion protruding away from the cap plate and enclosing the outer surface of the electrode terminal.

The second member may include a body portion enclosing the outer surface of the electrode terminal at a side of an outer surface of the frame portion and an end portion of the frame portion, and a hook protruding from the body portion toward the cap plate, the hook being hooked to the plate portion.

The body portion may be coupled with a surface of the plate portion opposite to the cap plate, the outer surface of the frame portion, the end portion of the frame portion, and the outer surface of the electrode terminal while having the step.

An inner surface of the body portion may include a horizontal first inner surface coupled with the surface of the plate portion opposite to the cap plate, a vertical second inner surface, the second inner surface being vertically connected to the first inner surface and being coupled with the outer surface of the frame portion, a horizontal third inner surface, the third inner surface being vertically connected to the second inner surface and being coupled with the end portion of the frame portion, and a vertical fourth inner surface, the fourth inner surface being vertically connected to the third inner surface and being coupled with the outer surface of the electrode terminal.

The electrode terminal may include a rivet terminal coupled with the terminal hole of the cap plate, a plate terminal connected to the rivet terminal, and a bolt terminal connected to the plate terminal.

The plate terminal may include a lower plate connected to the rivet terminal, and an upper plate welded to the lower plate and fastening the bolt terminal.

The body portion may close and seal a connection line of at least the lower plate and the upper plate by a vertical inner surface.

An inner surface of the body portion may include a horizontal first inner surface coupled with the surface of the plate portion opposite to the cap plate, a vertical second inner surface, the second inner surface being vertically connected to the first inner surface and being coupled with the outer surface of the frame portion, a horizontal third inner surface, the third inner surface being disposed vertically to the second inner surface and being coupled with the end portion of the frame portion, a vertical fourth inner surface, the fourth inner surface being coupled with the outer surface of the electrode terminal, and an inclined fifth inner surface, the fifth inner surface being coupled with an inclined surface that connects between the end portion of the frame portion and the outer surface of the electrode terminal.

An inner surface of the body portion may include a horizontal first inner surface, the first inner surface being coupled with the surface of the plate portion opposite to the cap plate, a vertical second inner surface, the second inner surface being vertically connected to the first inner surface, being coupled with one portion of the outer surface of the frame portion, and being partially separated from another portion of the outer surface of the frame portion, a horizontal third inner surface, the third inner surface being vertically connected to the second inner surface and being coupled with the end portion of the frame portion, and a vertical fourth inner surface, the fourth inner surface being coupled with the outer surface of the electrode terminal.

The frame portion may include a protrusion protruding from the outer surface of the frame portion at the end portion thereof, the second inner surface may form a groove coupled with the protrusion, and in a state in which the frame portion is coupled to the second inner surface, an outside of the frame portion and the groove may form a separation space therebetween.

The electrode terminal may include a negative terminal and a positive terminal, the case may be connected to the positive terminal, and the insulator may insulate the negative terminal from the cap plate.

The electrode terminal may include a negative terminal and a positive terminal, the case may insulate the negative terminal and the positive terminal, and the insulator may insulate the negative terminal and the positive terminal from the cap plate.

The insulator may further include a third member between an outer surface of the cap plate and a surface of the first member facing the cap plate.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2011-0119009, filed on Nov. 15, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
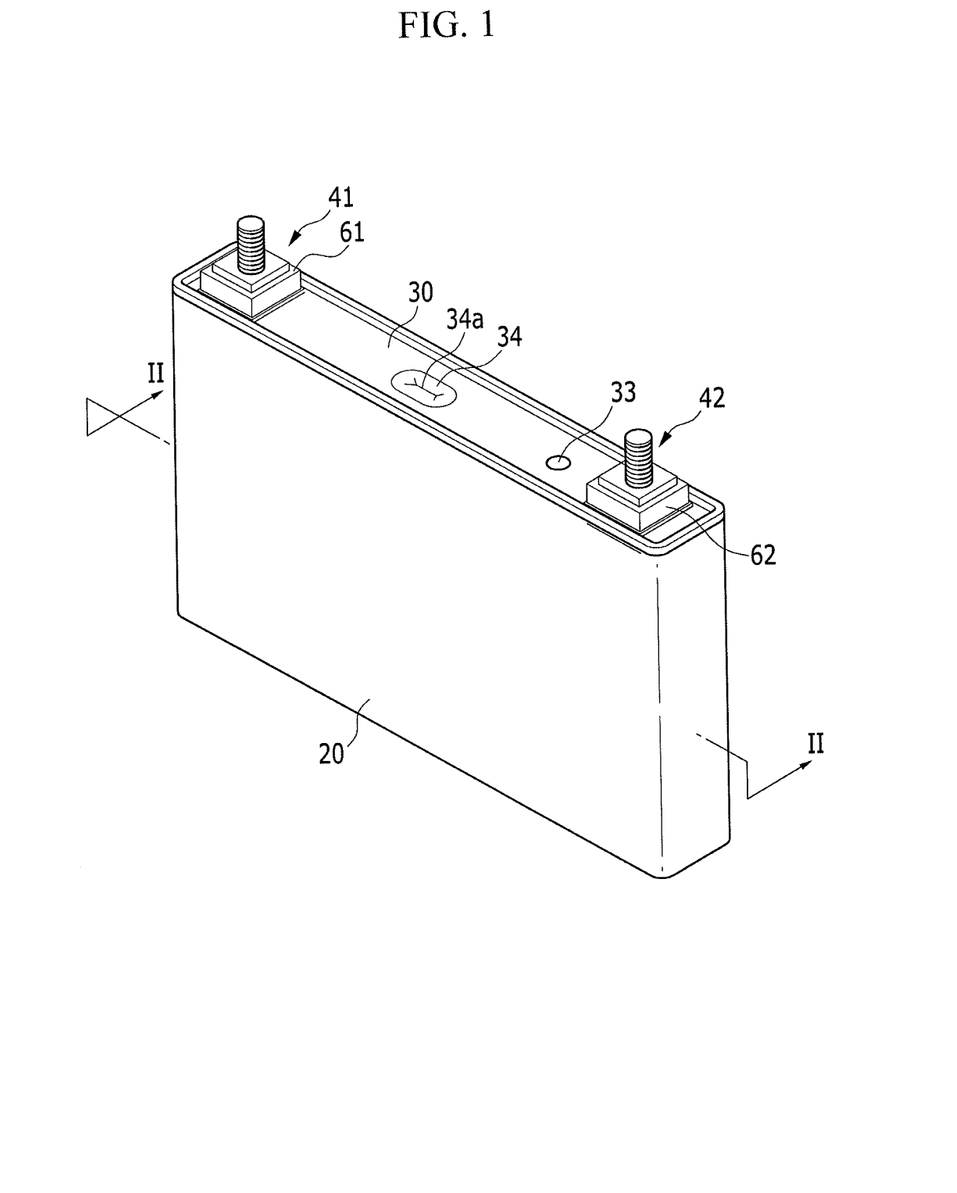
FIG. 1 illustrates a perspective view of a rechargeable battery according to an embodiment.
Figure 2:
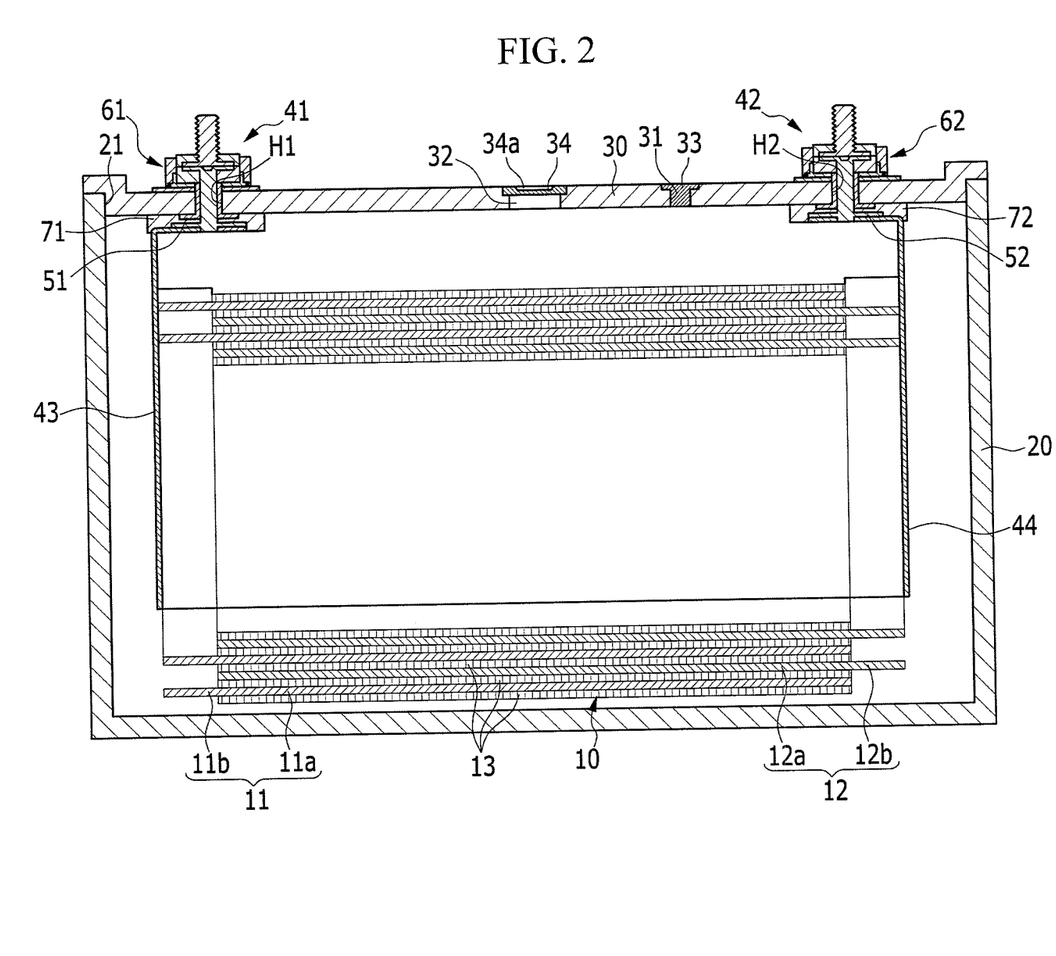
FIG. 2 illustrates a cross-sectional view taken along the line II-II of FIG. 1.

FIG. 1 illustrates a perspective view of a rechargeable battery according to an embodiment. FIG. 2 illustrates a cross-sectional view taken along the line II-II of FIG. 1.

Referring to FIG. 1 and FIG. 2, a rechargeable battery according to the present embodiment may include an electrode assembly 10 (that iteratively performs charging and discharging), a case 20 (accommodating an electrolyte solution and the electrode assembly 10), a cap plate 30 (coupled with, e.g., an opening 21 of, the case 20), an electrode terminal (installed on or in the cap plate 30, e.g., positive and negative terminals 41 and 42), and an insulator (electrically insulating the positive and negative terminals 41 and 42 and the cap plate 30, e.g., positive and negative insulators 61 and 62).

The electrode assembly 10 may include a negative electrode 11 and a positive electrode 12 disposed at sides of a separator 13 (e.g., an electric insulator). The electrode assembly 10 may be formed by winding the negative electrode 11, the separator 13, and the positive electrode 12 in a jelly roll state.

In an implementation, the electrode assembly 10 may be assembled by laminating the negative electrode 11 and the positive electrode 12 (each of which being formed as a single plate) with the separator 13 interposed therebetween, or by bending and laminating the negative electrode 11, the separator 13, and the positive electrode 12 in a zigzag form (not shown).

The negative and positive electrodes 11 and 12 may respectively include coated regions 11a and 12a (formed by coating an active material (not shown) on respective current collectors) and uncoated regions 11b and 12b (formed of an exposed portion of the respective current collectors that is not coated with the active material) at a side of the coated regions 11a and 12a. For example, the current collector of the negative electrode 11 may be formed of a copper thin film, and the current collector of the positive electrode 12 may be formed of an aluminum thin film.

The uncoated region 11b of the negative electrode 11 may be formed at one end of the negative electrode 11 along the coated region 11a of the wound negative electrode 11. The uncoated region 12b of the positive electrode 12 may be formed at one end of the positive electrode 2 along the coated region 12a of the wound positive electrode 12. For example, the uncoated regions 11b and 12b may be respectively disposed at lateral ends of the electrode assembly 10 to facilitate an electric connection between the electrode terminal 40 to the electrode assembly 10.

The case 20 may include an opening 21 at one side thereof. Thus, the electrode assembly 10 may be inserted through the opening 21. The case 20 may have a cuboid or hexahedral shape forming a receiving space for the electrode assembly 10 and the electrolyte solution.

The cap plate 30 may be coupled with the case 20, e.g., the opening 21 of the case 20. Thus, the cap plate 30, along with the case 20, a closed receiving space may be formed. For example, when the case 20 and the cap plate 30 are made of aluminum and are coupled with each other by welding, a welding property may be improved because the case 20 and the cap plate 30 are made of the same material.

The cap plate 30 may include an electrolyte injection opening 31 and a vent hole 32. The electrolyte injection opening 31 may facilitate injection of the electrolyte solution into the case 20. After injection of the electrolyte solution, the electrolyte injection opening 31 may be sealed by a sealing cap 33.

The vent hole 32 may be closed and sealed by a vent plate 34 welded thereto. The vent hole 32 may help prevent explosion of the rechargeable battery by venting internal gas generated, e.g., during charging and discharging of the rechargeable battery 100. When an internal pressure of the rechargeable battery reaches a predetermined level, the vent plate 34 may be ruptured. In an implementation, a notch 34a may be formed in the vent plate 34 to facilitate the rupture of the vent plate 34.

The cap plate 30 may include terminal through holes H1 and H2 to facilitate an electrical connection of the inside and the outside of the case 20. The positive and negative electrode terminals 41 and 42 may be respectively installed in the terminal holes H1 and H2 of the cap plate 30 and may be connected to the electrode assembly 10 by lead tabs, e.g., respective negative and positive electrode lead tabs 43 and 44.

For example, the positive terminal 41 may be electrically connected to the positive electrode 11 of the electrode assembly 10 by the positive electrode lead tab 43, and the negative electrode terminal 42 may be electrically connected to the negative electrode 12 of the electrode assembly 10 by the negative electrode lead tab 44

The positive and negative insulators 61 and 62 may be interposed between the respective positive and negative terminals 41 and 42 and an outer surface of the cap plate 30, thereby electrically insulating the respective terminals 41 and 42 from each other and from the cap plate 30. A detailed explanation of the insulating of the positive and negative terminals 41 and 42 by the positive and negative insulators 61 and 62 will be provided below.

The rechargeable battery may further include gaskets 51 and 52 for sealing between the positive and negative terminals 41 and 42 and the respective terminal holes H1 and H2. The gaskets 51 and 52 may be interposed between the positive and negative terminals 41 and 42 and an inner surface of the cap plate 30, thereby electrically insulating and sealing therebetween. The gaskets 51 and 52 may be inserted into the terminal holes H1 and H2 such that the positive and negative terminals 41 and 42 and the respective terminal holes H1 and H2 are further electrically insulated.

Figure 3:
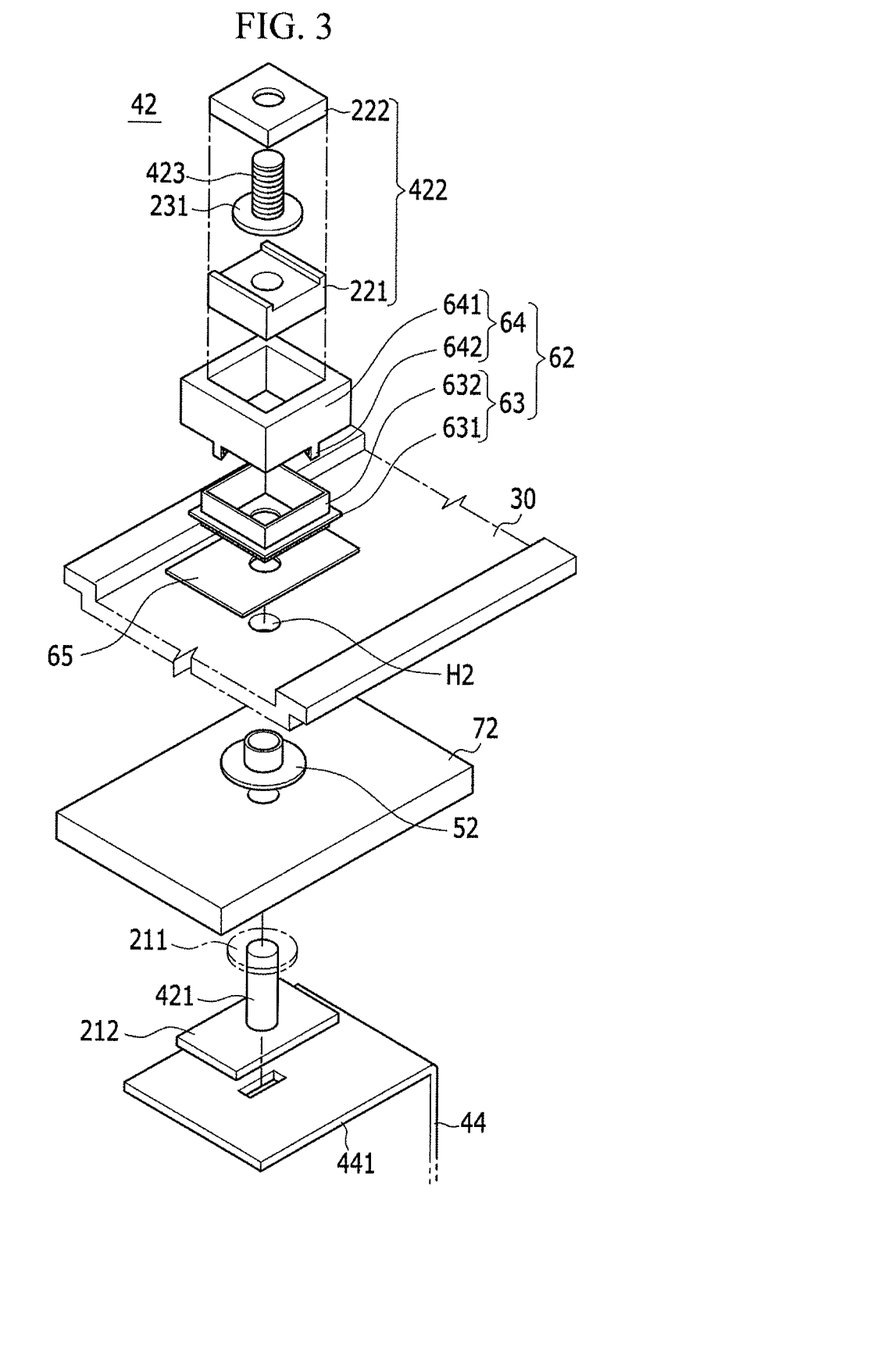
FIG. 3 illustrates an exploded perspective view of a negative terminal of the rechargeable battery of FIG. 2.
Figure 4:
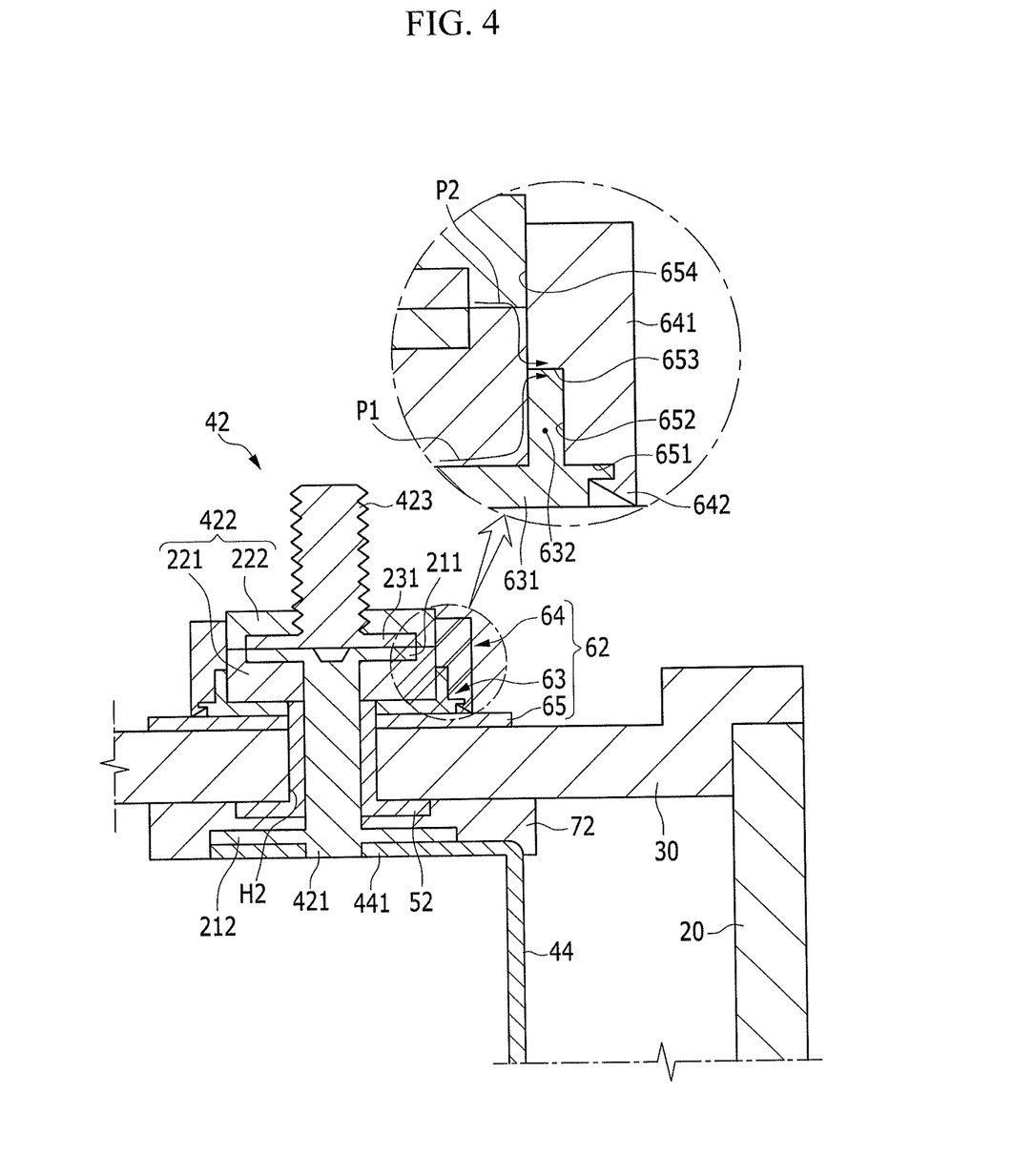
FIG. 4 illustrates an assembled cross-sectional view of the negative terminal of FIG. 3.

The rechargeable battery may further include inside insulators 71 and 72 receiving the gaskets 51 and 52 and insulating between the inner surface of the cap plate 30 and a facing surface of the positive and negative terminals 41 and 42 corresponding thereto (see FIG. 3 and FIG. 4).

As described above, a connection structure of the positive and negative insulators 61 and 62, the gasket 51 and 52, and the inside insulators 71 and 72 may have a neutral polarity, without providing a positive polarity or a negative polarity to the cap plate 30 and the case 20. For example, the cap plate 30 and the case 20 may be electrically insulated from the electrode assembly 10 and may not serve as a terminal of the battery.

The connection structure of the positive terminal 41 and the terminal through hole H1 and the negative terminal 42 and the terminal through hole H2 may be identically or similarly formed. Thus, for convenience, a description of the connection structure of the positive terminal 41 and the terminal through hole H1 may be omitted, and the connection structure of the negative terminal 42 and the terminal through hole H2 is described as an example.

The positive and negative insulators 61 and 62 and the inside insulator 71 and 72 may have the same structure for insulating and supporting the positive and negative terminals 41 and 42. Thus, for convenience, a description of the structure of the insulating and supporting of the positive insulator 61 and one inside insulator 71 to the positive terminal 41 may be omitted, and the structure of the insulating and supporting of the negative insulator 62 and the other inside insulator 72 to the negative terminal 42 is described as an example.

FIG. 3 illustrates an exploded perspective view of the negative terminal 42 of FIG. 2. FIG. 4 illustrates an assembled cross-sectional view of the negative terminal 42 of FIG. 3.

For example, FIG. 3 and FIG. 4 show an example of the structure insulating and supporting the negative terminal 42 by the negative insulator 62 and the inside insulator 72 by coupling the negative terminal 42, the negative insulator 62, and the inside insulator 72 to the terminal through hole 112.

Referring to FIG. 3 and FIG. 4, the negative terminal 42 may include a rivet terminal 421 (coupled with the terminal through hole H2), a plate terminal 422 (connected to the rivet terminal 421), and a bolt terminal 423 (connected to the plate terminal 422).

The rivet terminal 421 may be inserted in the terminal through hole H2 of the cap plate 30, thereby electrically connecting the inside and the outside of the rechargeable battery. The rivet terminal 421 may be electrically insulated from the terminal through hole 112 by the negative insulator 62, the inside insulator 72, and the gasket 52. The rivet terminal 421 may be electrically connected to the negative electrode lead tab 44 at a side of an inner surface of the cap plate 30.

In an implementation, the negative electrode lead tab 44 may be formed of a same material as the rivet terminal 421, e.g., copper. A lower portion of the rivet terminal 421 may be inserted into a connection portion 441 of the lead tab 44 to caulk the lower portion of the rivet terminal 421 or to weld the connection portion 441 and the rivet terminal 421 in the inserted portion, thereby establishing an electrical connection to the negative terminal 42. The rivet terminal 421 may include a flange 212 at a lower side thereof, thereby increasing a contact area with the connection portion 441.

The plate terminal 422 may be disposed at an outer side or surface of the cap plate 30. The negative insulator 62 may be interposed between the plate terminal 422 and the cap plate 30 such that the plate terminal 422 may be insulated from the cap plate 30. For example, the plate terminal 422 may include a lower plate 221 and an upper plate 222 that face one another and are welded to each other in a vertical direction (e.g., in a plane of FIG. 3 and FIG. 4).

The lower plate 221 may be connected to the rivet terminal 421 by riveting. The upper plate 222 may be welded to the lower plate 221, and a space between the facing lower plate 221 and upper plate 222 may receive a head portion 211 of the rivet terminal 421 and an expansion portion 231 of the bolt terminal 423, thereby coupling the bolt terminal 423 with the rivet terminal 421.

The bolt terminal 423 may be coupled with the plate terminal 422. Thus, the negative electrode 12 of the electrode assembly 10 may be electrically connected outside the case 20. For example, the negative electrode 12 of the electrode assembly 10 may be electrically connected to the bolt terminal 423 through the negative electrode lead tab 44, the rivet terminal 421, and the plate terminal 422.

In an implementation, a bus bar (not shown) may be disposed at the upper plate 222 through the bolt terminal 423, and may be fixed by a nut (not shown) coupled with the bolt terminal 423, thereby connecting the rechargeable batteries in series or in parallel.

The negative insulator 62 may include a first member 63 and the second member 64 coupled with each other with a step structure and insulation-supporting the negative terminal 42. The first member 63 may be installed between the outside of the cap plate 30 and a surface of the negative terminal 42 facing the cap plate 30. The second member 64 may be installed on the cap plate 30 to form a structure enclosing an outer surface of the negative terminal 42 and an outer surface of the first member 63.

For example, the first member 63 may include a plate portion 631 and a frame portion 632 and may have an upper opening structure to receive the lower plate 221. The plate portion 631 may be inserted between the outside of the cap plate 30 and a lower surface of that lower plate 221 (e.g., the surface of the negative terminal 42 facing the cap plate 30) near the terminal through hole H2, thereby electrically insulating and sealing between the cap plate 30 and the lower plate 221.

The frame portion 632 may protrude from the plate portion 631 away from (an upper direction in FIGS. 3 and 4) the cap plate 30, thereby enclosing the outer surface of the negative terminal 42. For example, the frame portion 632 may protrude at a side of an outer surface of the lower plate 221 at a periphery of the plate portion 631, thereby enclosing the outer surface of the lower plate 221 and electrically insulating the lower plate 221.

The second member 64 may receive or accommodate the first member 63. The second member 64 may include a body portion 641 and a hook 642 for receiving or surrounding an outer surface of the lower and the upper plates 221 and 222. The body portion 641 may enclose the outer surface of the negative terminal 42 at the side of the outer surface of the frame portion 632 as well as an end portion of the frame portion 632. For example, the body portion 641 may enclose a welded connection line of the lower and upper plates 221 and 222 for electrical insulating and sealing, and may seal around the frame portion 632 and the lower plate 221.

In an implementation, the negative insulator 62 may further include a third member 65 between the outer surface of the cap plate 30 and a surface of the first member 63 facing the cap plate 30. In this case, the third member 65 may further provide insulating and sealing functions between the cap plate 30 and the first member 63.

The hook 642 may protrude toward the cap plate 30 from the body portion 641 and may be hooked outside of the plate portion 631. Clamping of the hook 642 and the plate portion 631 may determine clamping of the first and second members 63 and 64.

The first member 63 and the second member 64 may be coupled in a step structure. For example, the body portion 641 may be coupled with the surface of the plate portion 631 opposite to the cap plate 30, the outer surface of the frame portion 632, the end portion of the frame portion 632, and the outer surface of the lower and the upper plates 221 and 222 while having the step.

For example, referring to the enlarged portion of FIG. 4, an inner surface of the body portion 641 may have the step structure. For example, the inner surface of the body portion 641 may include a first inner surface 651, a second inner surface 652, a third inner surface 653, and a fourth inner surface 654.

The first inner surface 651 may be formed horizontally and may be coupled with the surface of the plate portion 631 opposite to, e.g., facing away from, the cap plate 30. The second inner surface 652 may be connected vertically to the first inner surface 651, may extend vertically, and may be coupled with the outer surface of the frame portion 632. The third inner surface 653 may be connected vertically to the second inner surface 652, may extend horizontally, and may be coupled with the end portion of the frame portion 632. The fourth inner surface 654 may be connected vertically to the third inner surface 653, may extend vertically, and may be coupled with outer surfaces of the lower and the upper plates 221 and 222. For example, the fourth inner surface 654 may extend vertically, thereby closing and sealing a connection line of the lower and the upper plates 221 and 222. The fourth inner surface 654 may be formed with a thinner path than the second inner surface 652.

The second member 64 may be coupled with the plate portion 631 and the frame portion 632 of the first member 63 at the first, second, third, and fourth inner surfaces 651, 652, 653, and 654. For example, the first and second members 63 and 64 may be coupled with the step structure.

This step structure may increase a length of a first transmission path P1 (between the coupled frame portion 632 and lower plate 221) and may increase a length of a second transmission path P2 (between the coupled upper and the upper plates 221 and 222). Accordingly, penetration and condensation of moisture outside and inside the negative terminal 42 may be reduced and/or prevented. Thus, corrosion of the negative terminal 42 due to the moisture condensation may be reduced and/or prevented.

As described above, when the case 20 and the cap plate 30 have the neutral polarity, the structure of the negative insulator 62 may be identical or similar to the positive insulator 61. Thus, the corrosion of the positive terminal 41 due to penetration and condensation of moisture may be reduced and/or prevented.

In an implementation, when the case 20 and the cap plate 30 have a positive polarity, the positive terminal 41 may not include the positive insulator, and the negative terminal 42 may include the negative insulator such that the negative terminal 42 may be insulated from the cap plate (not shown).

Next, various other embodiments will be described. To avoid repeated descriptions, the same constitutions of the previous embodiment may be omitted, and different constitutions will be described.

Figure 5:
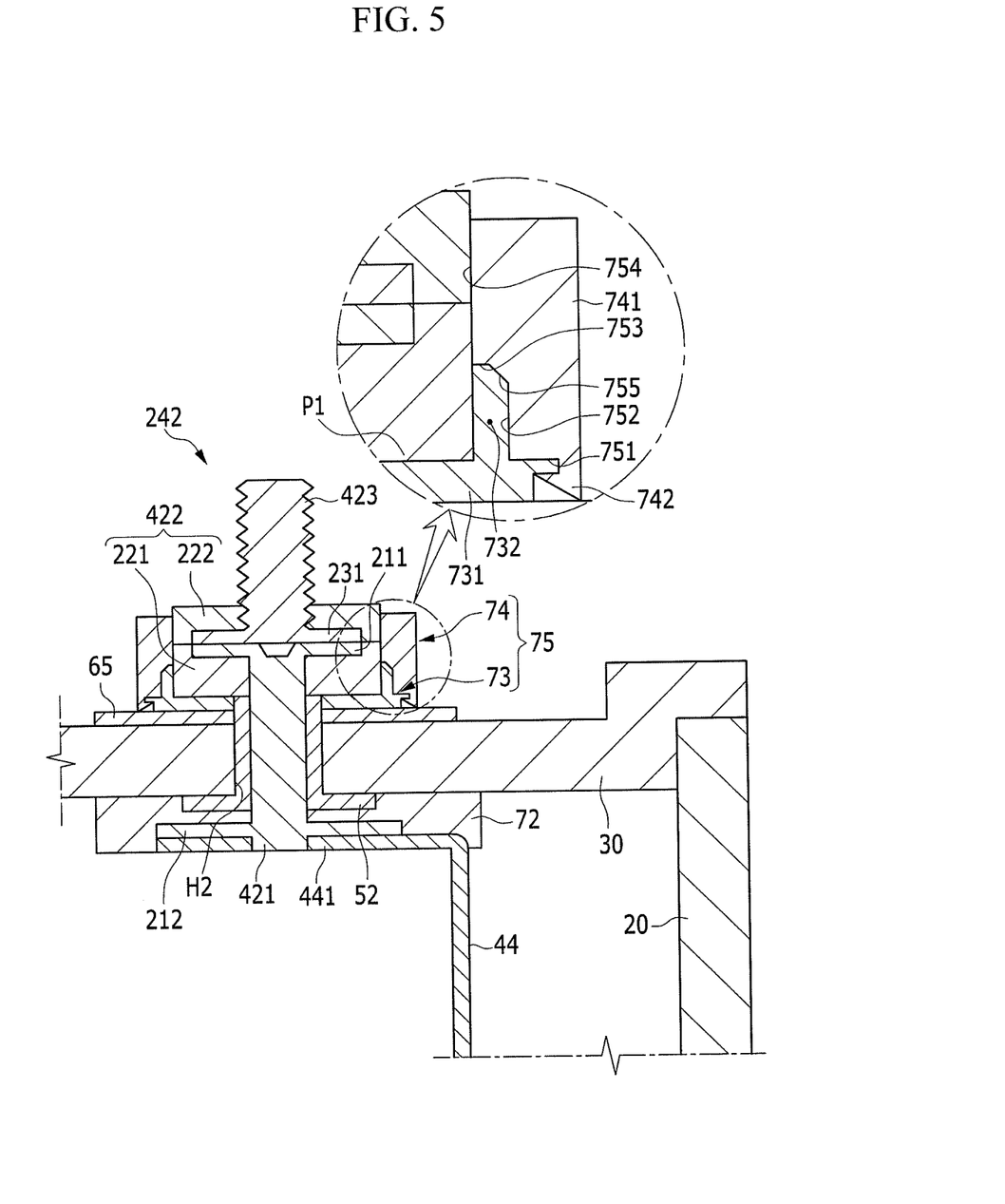
FIG. 5 illustrates an assembled cross-sectional view of a negative terminal in a rechargeable battery according to another embodiment.

FIG. 5 illustrates an assembled cross-sectional view of a negative terminal 242 in a rechargeable battery according to another embodiment. Referring to FIG. 5, in a second member 74 forming one side of a negative insulator 75, a body portion 741 may further include a fifth inner surface 755 obliquely formed at an inner surface thereof. Accordingly, a first member 73 may include an inclined surface connecting an outer surface of an end portion of a frame portion 732 to form another side of the negative insulator 75.

Referring to the enlarged portion of FIG. 5 in detail, the body portion 741 may have the inner surface with the step structure. For example, the body portion 741 may include a first inner surface 751, a second inner surface 752, a third inner surface 753, a fourth inner surface 754, and the fifth inner surface 755.

The first inner surface 751 may extend horizontally and may be coupled with a surface of the plate portion 731 opposite to the cap plate 30. The second inner surface 752 may be connected vertically to the first inner surface 751, may extend vertically, and may be coupled with an outer surface of the frame portion 732. The third inner surface 753 may be formed vertically relative to the second inner surface 752, may extend horizontally, and may be coupled with the end portion of the frame portion 732. The fourth inner surface 754 may be connected vertically to the third inner surface 753, may extend vertically, and may be coupled with outer surfaces of the lower and upper plates 221 and 222. For example, the fourth inner surface 754 may extend vertically to close and seal the connection line of the lower and the upper plates 221 and 222. The fourth inner surface 754 may be formed with a thinner path than the second inner surface 752. The fifth inner surface 755 may be formed with the inclined surface and may be coupled with the inclined surface connecting the end portion and the outer surface of the frame portion 732.

Accordingly, when connecting the second member 74 to the first member 73, the inclined surface of the frame portion 732 may be close to the fifth inner surface 755 of the body portion 741. The frame portion 732 may include the inclined surface at the end portion, thereby facilitating coupling of the first member 73 and the second member 74 and forming a close coupling structure of the body portion 741 and the frame portion 732.

Figure 6:
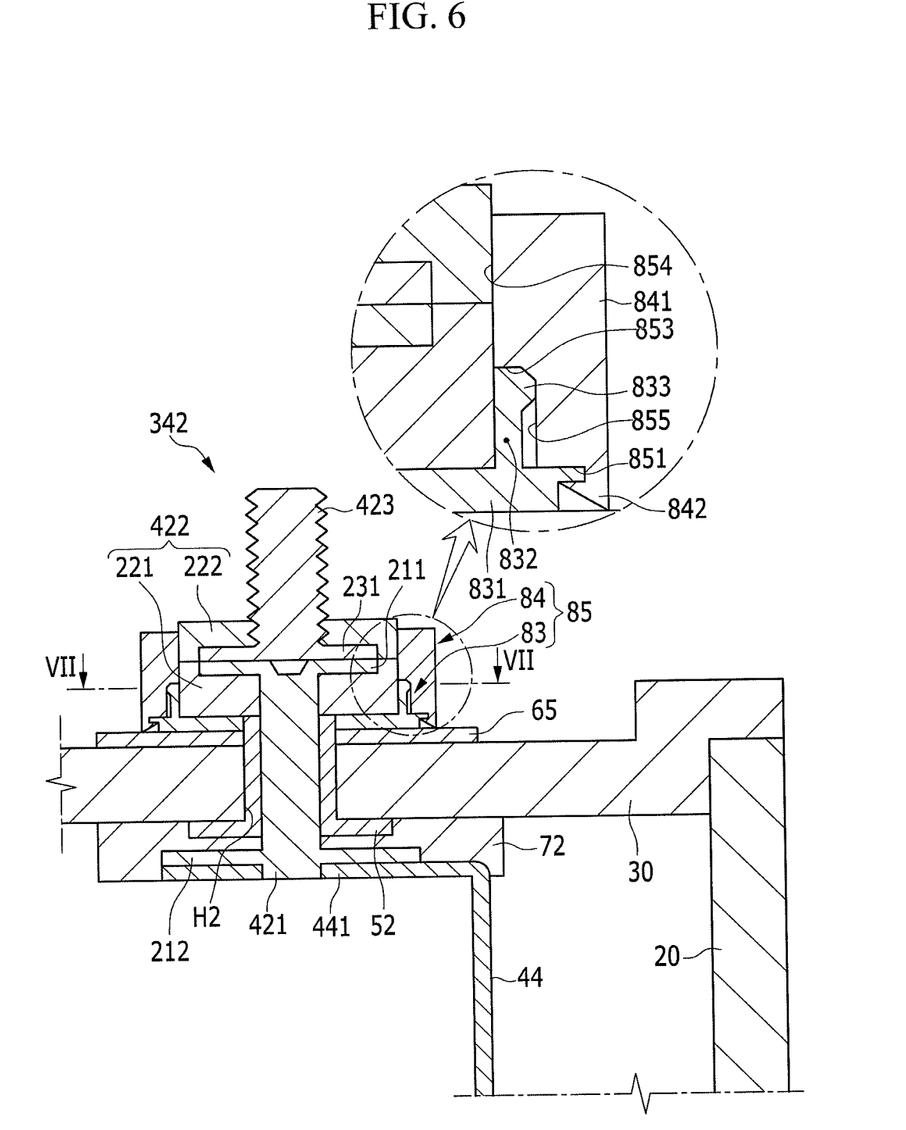
FIG. 6 illustrates an assembled cross-sectional view of a negative terminal in a rechargeable battery according to yet another embodiment.
Figure 7:
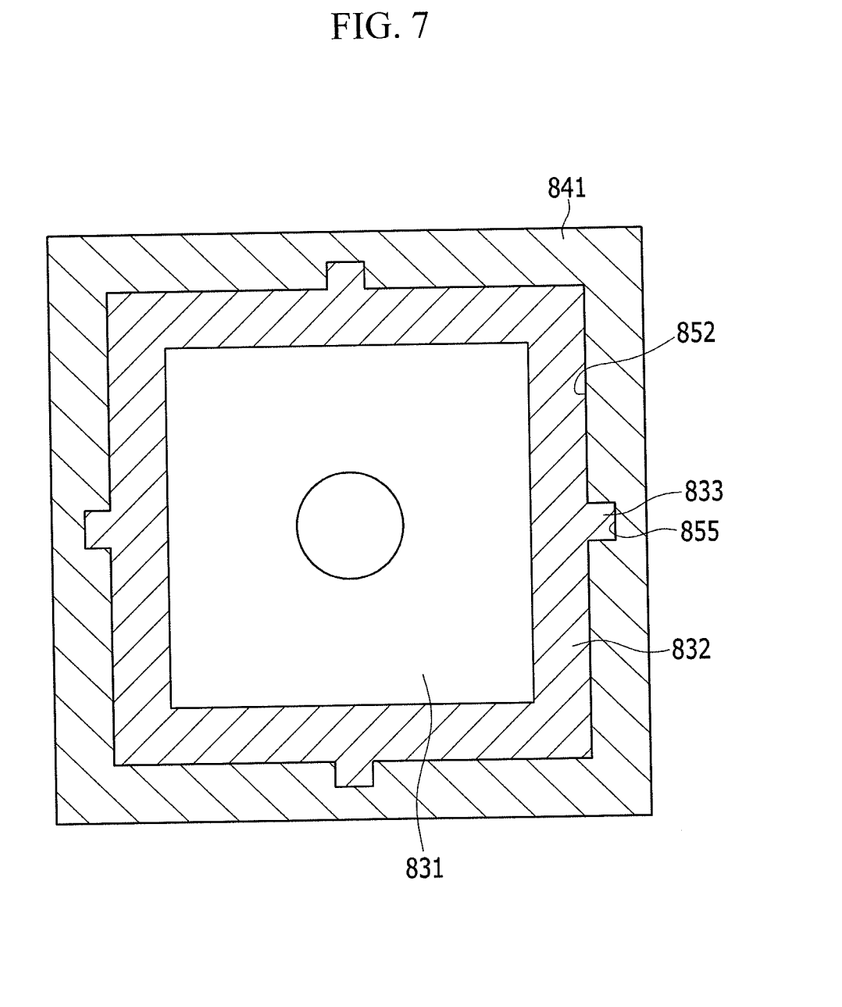
FIG. 7 illustrates a cross-sectional view taken along the line VII-VII of FIG. 6.

FIG. 6 illustrates an assembled cross-sectional view of a negative terminal 342 in a rechargeable battery according to yet another embodiment. FIG. 7 illustrates a cross-sectional view taken along VII-VII of FIG. 6. Referring to FIG. 6 and FIG. 7, first and second members 83 and 84 of a negative insulator 82 may form a separated portion in a state in which they are connected to each other.

Referring to the enlarged portion of FIG. 6 in detail, a body portion 841 may form an inner surface having the step structure. For example, the inner surface may include a first inner surface 851, a second inner surface 852, a third inner surface 853, and a fourth inner surface 854.

The first inner surface 851 may extend horizontally and may be coupled with a side surface of the plate portion 831 opposite to the cap plate 30. The second inner surface 852 may be connected vertically to the first inner surface 851, may be coupled with an outer surface of a frame portion 832, and may be partially separated from and extend vertically to the outer surface of the frame portion 832. The third inner surface 853 may be connected vertically to the second inner surface 852, may extend horizontally, and may be coupled with an end portion of the frame portion 832. The fourth inner surface 854 may be formed vertically and may be coupled with the outer surface of the lower and the upper plates 221 and 222.

In the body portion 841, the second inner surface 852 may further form a groove 855 that is concave in a horizontal direction in the second inner surface 852. The groove 855 may be separately disposed with a predetermined interval according to a circumference direction in the second inner surface 852.

The frame portion 832 may include a protrusion 833 protruding from the outer surface of the frame portion 832 at the end portion thereof. The protrusion 833 may be coupled with the groove 855. The protrusion 833 may be coupled with the groove 855 at the end portion of the frame portion 832 such that a separation space between the frame portion 832 (at which the protrusion 833 is formed) and the second inner surface 852 of the body portion 841 is formed.

When the first and second members 83 and 84 are coupled with each other, the groove 855 may help guide insertion of the protrusion 833 of the frame portion 832. The coupling structure of the protrusion 833 and the groove 855 may help reduce and/or prevent relative rotation of the first and second members 83 and 84 by an external force, thereby reinforcing a fastening force of the hook 842 and the plate portion 831.

By way of summation and review, moisture may penetrate between the plate terminal and the insulator, and may condense. The plate terminal may include, e.g., a lower plate (connected to the rivet terminal), and an upper plate (connected to the bolt terminal). For example, the lower and upper plates may be connected to each other, and moisture may penetrate between the lower plate and the upper plate and condense.

The insulator may include a lower insulator member (between the lower plate and the cap plate) and an upper insulator member (enclosing a side surface of the plate terminal). Moisture may penetrate and condense between the upper and lower insulator members.

The condensation of the moisture penetrating between the electrode terminal and the cap plate, between the constituent elements of the electrode terminal, and between the constituent elements of the insulator may cause undesirable corrosion of the electrode terminal.

The embodiments provide a rechargeable battery in which corrosion of the electrode terminal may be reduced and/or prevented by preventing penetration and condensation of moisture outside and inside an electrode terminal.

According to the embodiments, the first member and the second member coupled with the step may form an insulator, and the insulator may insulate the electrode terminal from the cap plate, thereby reducing and/or preventing penetration of moisture between the constituent elements of the electrode terminal. Accordingly, corrosion of the electrode terminal (caused by the condensation of the moisture) may be prevented inside and outside the electrode terminal and the electrode terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly performing charging and discharging;
   a case accommodating the electrode assembly;
   a cap plate coupled with the case;
   an electrode terminal in a terminal hole of the cap plate, the electrode terminal being electrically connected to the electrode assembly; and
   an insulator electrically insulating the electrode terminal and the cap plate,
   wherein the insulator includes:
      a first member between an outside of the cap plate and a surface of the electrode terminal facing the cap plate, and
      a second member enclosing an outer surface of the electrode terminal and the first member and being coupled with the first member with a step structure,
   wherein the first member includes:
      a plate portion between the outside of the cap plate and the surface of the electrode terminal facing the cap plate, and
      a frame portion on the plate portion, the frame portion protruding away from the cap plate and enclosing the outer surface of the electrode terminal, and
   wherein the plate portion includes a peripheral region that outwardly extends in parallel with a surface of the cap plate and away from a region from which the frame portion protrudes.

2. The rechargeable battery as claimed in claim 1, wherein the second member includes:
   a body portion enclosing the outer surface of the electrode terminal at a side of an outer surface of the frame portion and an end portion of the frame portion, and
   a hook protruding from the body portion toward the cap plate, the hook being hooked to the plate portion.

3. The rechargeable battery as claimed in claim 2, wherein the body portion is coupled with:
   a surface of the plate portion opposite to the cap plate,
   the outer surface of the frame portion,
   the end portion of the frame portion, and
   the outer surface of the electrode terminal while having the step.

4. The rechargeable battery as claimed in claim 3, wherein an inner surface of the body portion includes:
   a horizontal first inner surface coupled with the surface of the peripheral region of the plate portion opposite to the cap plate, a vertical second inner surface, the second inner surface being vertically connected to the first inner surface and being coupled with the outer surface of the frame portion, a horizontal third inner surface, the third inner surface being vertically connected to the second inner surface and being coupled with the end portion of the frame portion, and a vertical fourth inner surface, the fourth inner surface being vertically connected to the third inner surface and being coupled with the outer surface of the electrode terminal.

5. The rechargeable battery as claimed in claim 2, wherein the electrode terminal includes:

a rivet terminal coupled with the terminal hole of the cap plate, a plate terminal connected to the rivet terminal, and a bolt terminal connected to the plate terminal.

6. The rechargeable battery as claimed in claim 5, wherein the plate terminal includes:

a lower plate connected to the rivet terminal, and an upper plate welded to the lower plate and fastening the bolt terminal.

7. The rechargeable battery as claimed in claim 6, wherein the body portion closes and seals a connection line of at least the lower plate and the upper plate by a vertical inner surface.

8. The rechargeable battery as claimed in claim 3, wherein an inner surface of the body portion includes:

a horizontal first inner surface coupled with the surface of the peripheral region of the plate portion opposite to the cap plate, a vertical second inner surface, the second inner surface being vertically connected to the first inner surface and being coupled with the outer surface of the frame portion, a horizontal third inner surface, the third inner surface being disposed vertically to the second inner surface and being coupled with the end portion of the frame portion, a vertical fourth inner surface, the fourth inner surface being coupled with the outer surface of the electrode terminal, and an inclined fifth inner surface, the fifth inner surface being coupled with an inclined surface that connects between the end portion of the frame portion and the outer surface of the electrode terminal.

9. The rechargeable battery as claimed in claim 3, wherein an inner surface of the body portion includes:

a horizontal first inner surface, the first inner surface being coupled with the surface of the peripheral region of the plate portion opposite to the cap plate, a vertical second inner surface, the second inner surface being vertically connected to the first inner surface, being coupled with one portion of the outer surface of the frame portion, and being partially separated from another portion of the outer surface of the frame portion, a horizontal third inner surface, the third inner surface being vertically connected to the second inner surface and being coupled with the end portion of the frame portion, and a vertical fourth inner surface, the fourth inner surface being coupled with the outer surface of the electrode terminal.

10. The rechargeable battery as claimed in claim 9, wherein the frame portion includes a protrusion protruding from the outer surface of the frame portion at the end portion thereof, the second inner surface forms a groove coupled with the protrusion, and in a state in which the frame portion is coupled to the second inner surface, an outside of the frame portion and the groove form a separation space therebetween.

11. The rechargeable battery as claimed in claim 1, wherein:

the electrode terminal includes a negative terminal and a positive terminal, the case is connected to the positive terminal, and the insulator insulates the negative terminal from the cap plate.

12. The rechargeable battery as claimed in claim 1, wherein:

the electrode terminal includes a negative terminal and a positive terminal, the case insulates the negative terminal and the positive terminal, and the insulator insulates the negative terminal and the positive terminal from the cap plate.

13. The rechargeable battery as claimed in claim 1, wherein the insulator further includes a third member between an outer surface of the cap plate and a surface of the first member facing the cap plate.

* * * * *